United States Patent Office 3,493,000
Patented Feb. 3, 1970

3,493,000
METHOD FOR REDUCING THE FRICTIONAL DRAG OF FLOWING FLUIDS
Gerard P. Canevari, Cranford, and Jose M. Peruyero, Parsippany, N.J., assignors to Esso Research and Engineering Company, a corporation of Delaware
No Drawing. Filed Feb. 7, 1968, Ser. No. 703,537
Int. Cl. F17d 1/16
U.S. Cl. 137—13          6 Claims

ABSTRACT OF THE DISCLOSURE

The instant disclosure is directed to a method wherein small amounts of high bond energy, high strength polymers, are added to turbulently flowing liquids to reduce the frictional drag of the flowing liquid. The low degradation characteristics of the materials used in the instant invention insure the reduction of frictional drag for longer periods of time as compared to those materials employed in the art.

Background of the invention

This invention relates to a method of decreasing frictional loss in flowing liquids. More particularly, it relates to a method wherein high bond energy, high strength polymers, are intermixed with a liquid, thereby reducing the frictional loss in the transfer of the liquid by fluid flow.

In the operation of transferring liquids by fluid flow, it it well known that energy must be utilized to overcome the friction encountered in the movement of the liquid. Thus, when a fluid is transferred or pumped under pressure, the frictional loss is generally apparent as a pressure drop along the pipe or conduit in which the liquid is being transferred. Such pressure drops are particularly large under those conditions where the velocity of the liquid has exceeded the critical limit for laminar flow. The characteristic high frictional losses accompanying non-laminar flow are frequently met in those industrial operations where high fluid velocities are essential, such as in the movement of large volumes of liquid over large distances such as in the case of petroleum pipelines.

The expenditure of considerable amounts of energy is often necessary to compensate for the pressure drops caused by this friction loss. It is, therefore, obvious that a reduction in the frictional loss would result in lowering operating pressures which in turn would reduce power requirements. Similarly, using the same power input, increasing flow rates could be realized.

In the past the addition of various materials as friction reducers has been proposed. Thus, for example, the use of metallic soaps and other thickeners for gasoline and other hydrocarbon liquids is well known. Where large quantities of such thickeners are used, the liquid is converted into a non-Newtonian thixotropic gel. Thus, for example, in U.S. Patent No. 2,492,173, it is disclosed that the rate of flow of gasoline in a pipe could be increased by transforming the gasoline into such a thixotropic gel by the addition of a sufficient quantity of an appropriate thickener prior to the introduction of the gasoline into the pipeline.

In U.S. Patent No. 3,215,154, it is disclosed that the addition of certain high molecular weight polymers may be used to reduce friction losses without causing appreciable thickening of the liquid to be transferred.

The methods and materials of the instant invention achieve substantial improvements in the reduction of friction in flowing fluids over those methods and materials known in the prior art. While it is true that the viscoelastic polymers known and utilized in the prior art reduce frictional losses, their effect does not last long. The reason for this is that after a certain period of "working," the prior art polymers degrade due to polymer scission and, hence, the drag reducing capability of the polymer is lost.

In contrast to the polymeric materials utilized in the prior art, the materials herein subsequently discussed have very high resistance to degradation and, hence, their drag reducing ability maintains its effectiveness for much greater periods of time.

Summary of the invention

The instant invention contemplates the utilization of small amounts of high bond energy, high strength polymers, to reduce frictional drag in turbulently flowing liquids. By selecting materials having high bond energies. e.g. in the range of about 100 Kcal./mole, as well as those whose molecular structure/orientation provides increased shear stability, e.g. the increasing number and size of side chains decreases shear stability, the drag reducing ability which can be obtained persists for greater periods of time than is obtainable using those polymers currently known and used for this purpose. Such materials may include polydimethylsiloxane, an example of the former selection criteria, and cis-polyisoprene and cis-polybutadiene, as examples of the latter. It will also be appreciated by those skilled in the art that the drag reducing ability of a particular polymer type is a function of its molecular weight; a longer polymer chain resulting in more randomness or coiling and subsequent ability to absorb the turbulent energy. It, therefore, follows that it is extremely important to avoid degrading of the polymer chain by polymer scission since this will reduce the randomness or coiling and, hence, the ability to absorb turbulent energy.

While significant reductions in frictional losses are observed with the addition of polydimethylsiloxane or cis-polyisoprene or cis-polybutadiene or ethylene-propylene copolymer having viscosity average molecular weight as low as 0.8 million, it is preferred that these polymers have a viscosity average molecular weight in the range of from about 3 million to about 30 million and preferably in the range of from about 7 million to about 20 million. The materials of the instant invention also afford effective reductions in drag when present in concentrations as low as 5 p.p.m., although they are preferably employed in the range from about 100 p.p.m. to about 1,500 p.p.m. The optimum amount of these materials will vary, depending on the molecular weight of the polymer, the liquid, and the flow conditions of the liquid. If an amount significantly above the upper concentration is added, the viscosity of the fluid to be transported may increase to an undesirable extent.

In the practice of the instant invention, the polymeric material may be intermixed directly with the liquid to be transported as a finely divided solid. However, to increase the rate of solution, it is often preferable to use a concentrate prepared by dissolving the polymer in a suitable hydrocarbon carrier. To facilitate the preparation of the concentrate, the carrier may be heated to about 100° F. without any detrimental effect on the polymer's ability to reduce frictional losses. Temperatures in excess of 150 to 200° F. should be avoided since the polymers hereinabove cited may decompose at temperatures above this range.

Thus, it is an object of the instant invention to provide a method for the reduction of frictional loss resulting from the flow of fluid without causing appreciable thickening of the fluid.

Another object of the invention is to provide an improved method for pumping and transferring hydrocarbon fluids whereby normally experienced pressure drops due to the flow of the hydrocarbon fluid are appreciably decreased.

Still another object is to provide a method of the character described wherein small amounts of high molecular weight, high bond energy polymers, are added to the hydrocarbon fluid to reduce frictional losses without causing significant thickening of the hydrocarbon fluid being pumped.

These and further objects, as well as a better appreciation of the instant invention will be apparent from the following discussion of preferred embodiments.

Description of preferred embodiments

According to the teachings of the instant invention, the above highly desirable objectives are achieved by adding to the hydrocarbon fluid to be transferred small amounts of a high molecular weight, high bond energy, high strength polymer selected from the group consisting of polydimethylsiloxane, cis-polyisoprene, cis-polybutadiene and ethylene-propylene copolymer. These materials, which are soluble in most hydrocarbon fluids at the concentrations in which they are to be added, have been found to reduce frictional loss by as much as 70% when present in quantities as low as 40 p.p.m. based on the hydrocarbon fluid. These representative values will vary, of course, based on the actual molecular weight of the polymer and flow conditions as previously cited.

In order to demonstrate the improved results obtainable through the use of the instant method and materials, the following test setups were utilized:

Recirculating test equipment

The fluid to which the polymer has been added is pumped from a storage vessel through one of four horizontal test sections, after which it is recycled. The flow rate is measured by a calibrated rotameter installed in the line. Test sections of ¾", 1", 1½" and 3" (nominal) galvanized steel pipe were employed as the four test sections. Calming, or entrance lengths of about 54 pipe diameters, preceded a first pressure tap on each test section and exit lengths greater than 12 pipe diameters followed a last pressure tap before any type of geometric discontinuity is encountered. The pressure taps were formed by small holes carefully drilled in the pipe walls and were slightly rounded inside to remove any burrs. To verify the uniformity of the pressure gradient, the ¾" and 1" diameter test sections were divided into two subsections. The pressure drop could be measured across any of these subsections individually or across the whole of the test sections. Suitable liquids were used as pressure-transmitting media in lines connecting the pressure taps to a suitable manometer.

Effluent time test equipment

To determine relative reduction of the frictional drag, equipment comprising a four liter pressurized reservoir for the test fluid and a five foot length of ⅛" I.D. piping was employed. The test procedure was as follows:

(a) A 3½ liter sample of the test solution at room temperature is poured into the four liter reservoir.

(b) The desired pressure in the vessel is set by a regulated nitrogen supply.

(c) An outlet line is opened and the effluent time of the test fluid through the five foot length of ⅛" I.D. pipe is measured.

The following examples are presented to further describe the advantages of the instant invention. In these examples, the test equipment and procedures described above were employed.

EXAMPLE 1

Low degradation of polydimethylsiloxane

Table I illustrates the effect that the molecular structure has on the ability of the polymer to retain its friction reducing capabilities.

Two polymers, polyisobutylene having a viscosity average molecular weight of about $12 \times 10^6$ and polydimethylsiloxane having a molecular weight of about $10 \times 10^6$, which at the same concentrations had the same initial effluent time reduction, were run three successive times (at each concentration) through the effluent time test equipment at a pressure of 26 p.s.i.

As may be seen from examining the table, the loss of effluent time reduction (or drag reducing capability) of the polydimethylsiloxane was much lower than that of polyisobutylene.

TABLE I

| Polymer additive | Mol. wt. × 10⁶ | Loss of effluent time reduction, percent, p.p.m. of polymer in hexane | | | | | |
|---|---|---|---|---|---|---|---|
| | | 10 | 20 | 40 | 60 | 80 | 100 |
| Polydimethylsiloxane | ~10 | 27 | 17 | 12 | 10 | 8 | 5 |
| Polyisobutylene | ~10–12 | 41 | 31 | 27 | 25 | 24 | 23 |

EXAMPLE 2

Comparison of polydimethylsiloxane and cis-polybutadiene with polyisobutylene

The following data indicate the effectiveness of the materials of the instant invention as friction reducing additives. The depicted data permits comparison of these various polymers at similar molecular weights.

TABLE II

| Polymer additive | Mol. wt. × 10⁶ | Effluent time, reduction, percent, p.p.m. of polymer in hexane | | | | | |
|---|---|---|---|---|---|---|---|
| | | 5 | 20 | 40 | 60 | 80 | 100 |
| Polydimethylsiloxane | ~10 | 22 | 32 | 38 | 40 | 41 | 41 |
| Polyisobutylene | ~10–12 | 21 | 32 | 37 | 38 | 40 | 40 |
| Do | ~0.75–1.1 | | 0.3 | 0.5 | 0.8 | 1.2 | 1.5 |
| Cis-polybutadiene | ~0.7–0.8 | | | | | | 27.0 |

The data in Table II was obtained using the Effluent Time Test equipment described above.

An examination of Tables I and II reveals that the superiority of the materials of the instant invention as friction reducing additives. As earlier indicated, their resistance to degradation (and, hence, their ability to retain their friction reducing capabilities) is attributed to the higher bond energies present in the polymers. Thus, polyisobutylene, consisting of the repeating unit,

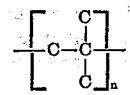

contains only C—C bonds in its chain backbond. The bond energy of the carbon-carbon single bond is approximately 59 Kcal./mol. In contrast polydimethylsiloxane having a structure comprising

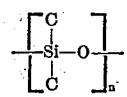

contains silicon-oxygen bonds, which bonds have a strength of about 100 Kcal./mol. It can be appreciated that other siloxane polymers such as polymethylvinylsiloxane and polymethylphenylsiloxane also possess this stronger bond.

It is pertinent to note that in addition to high bond energy, the existence of side chains in the molecular structure also effects the shear stability of the polymer. As the number and size of these side chains is increased, the shear stability is decreased. Thus polymers such as cis-polyisoprene, cis-polybutadiene and ethylene-propylene copolymer are also more shear stable than polyisobutylene (at similar molecular weights), which can be noted by an inspection of their respective molecular structures. Again, polyisobutylene appears as the repeating unit

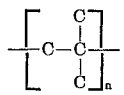

versus the less bulky structure of the ethylene propylene copolymer

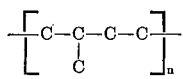

or cis-polybutadiene

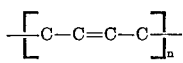

It can, therefore, be appreciated that stronger polymers may be selected, based on either or combinations of both of these properties. Thus, the use of the materials of the instant invention results in substantial drag reductions at much less degradation than can be achieved when using those prior art polymers sought to be useful for the instant purposes.

EXAMPLE 3

The following data were obtained using the Recirculating Test equipment fitted with the 1½" diameter test section, at a Reynolds Number of approximately 200,000, using hexane as the hydrocarbon fluid, and illustrate the pressure drop reductions with time obtained with polydimethylsiloxane of $30 \times 10^6$ molecular wt.

TABLE III

| Concentration (p.p.m.) of poly-dimethylsiloxane | Pressure drop reduction, percent, time (minutes) | | | | |
|---|---|---|---|---|---|
| | 0 | 30 | 60 | 120 | 160 |
| 10 | 33.1 | 6.7 | 3.7 | | |
| 100 | 51.5 | 28.2 | 21.2 | 17.8 | 16.5 |

It will be appreciated by those skilled in the art that a critical Reynolds Number ($Re_c$) exists below which no drag reduction occurs. Generally speaking, this critical Reynolds Number will usually be greater than $3 \times 10^3$ since this number evidences sufficient fluid turbulence to cause appreciable friction losses. The $Re_c$ also appears to increase as the pipe diameter increases and also appears to be dependent on the concentration of the polymer additive. Furthermore, $Re_c$ decreases as the molecular weight of the polymer increases. The use of the materials of the instant invention are particularly effective where flow rates result in Reynolds Numbers in the range of from about 10,000 to about 500,000 to about 10,000,000.

It will also be understood by those skilled in the art that the polymer additive should be soluble in the fluid being pumped and this will generally be the case where the fluid is hydrocarbon in nature. Typical examples of suitable fluids include hexane, pentane, cyclohexane, the isomers of octane, benzene, toluene and petroleum products such as crude oil, fuel oil and gasoline. In addition, reduced drag will also be experienced when pumping slurries of these fluids, which slurries contain suspended solids.

What is claimed is:

1. A process for reducing the fluid flow friction loss in the transmission of a hydrocarbon fluid which comprises intermixing with said fluid from 10 p.p.m. to 1500 p.p.m. of a high molecular weight polydimethylsiloxane resin and transferring the resulting mixture under conditions sufficient to establish turbulent flow as characterized by a Reynolds Number between $3 \times 10^3$ and 10,000,000 for a time sufficient such that the degradation of said resin is greatly reduced compared to the degradation encountered when an otherwise identical mixture is transmitted in which polyisobutylene is substituted for said resin.

2. The process of claim 1 wherein said resin has a viscosity average molecular weight in the range of from about $0.8 \times 10^6$ to about $30 \times 10^6$.

3. The process of claim 1 wherein said resin is polydimethylsiloxane having a viscosity average molecular weight of about $13 \times 10^6$ and is added to said fluids in amounts in the range of from about 20 to about 200 p.p.m.

4. In a process for reducing the fluid flow friction loss encountered in pipeline transmission of a fluid hydrocarbon wherein said fluid is transmitted for a time sufficient to substantially degrade a polyisobutylene friction reducing additive whereby its friction reducing properties are substantially decreased, the improvement which comprises intermixing with said fluid hydrocarbon from about 10 p.p.m. to about 1500 p.p.m. of polydimethylsiloxane resin having a viscosity average molecular weight in the range of 0.8 million to 30 million and thereafter transmitting the resulting mixture through said pipeline at a velocity sufficient to establish turbulent flow conditions as characterized by a Reynolds Number between $3 \times 10^3$ and 10,000,000.

5. The process of claim 4 further characterized in that the polydimethylsiloxane resin intermixed with said fluid has a viscosity average molecular weight of about $13 \times 10^6$ and is present in concentrations of from about 20 to about 200 p.p.m.

6. In a process for reducing the fluid flow friction loss encountered in pipeline transmission of a fluid hydrocarbon wherein said fluid is transmitted for a time sufficient to substantially degrade a polyisobutylene friction reducing additive whereby its friction reducing properties are substantially decreased, the improvement which comprises intermixing with said fluid hydrocarbon from about 10 p.p.m. to about 1500 p.p.m. of ethylene-propylene copolymer resin having a viscosity average molecular weight in the range of 0.8 million to 30 million and thereafter transmitting the resulting mixture through said pipeline at a velocity sufficient to establish turbulent flow conditions as characterized by a Reynolds Number between $3 \times 10^3$ and 10,000,000.

References Cited

UNITED STATES PATENTS 3,215,154   11/1965   White et al. _____ 137—13

ROBERT G. NILSON, Primary Examiner